Sept. 30, 1969  W. ODENDAHL  3,469,591
METHOD OF REDUCING FLUID PRESSURE AND DEVICE FOR SAME
Filed Feb. 21, 1967  5 Sheets-Sheet 1

Inventor:
WILHELM ODENDAHL

Sept. 30, 1969     W. ODENDAHL     3,469,591
METHOD OF REDUCING FLUID PRESSURE AND DEVICE FOR SAME
Filed Feb. 21, 1967     5 Sheets-Sheet 2

Inventor:
WILHELM ODENDAHL
Robertson, Bryant, Parmelee + Johnson

Sept. 30, 1969　　　　W. ODENDAHL　　　　3,469,591
METHOD OF REDUCING FLUID PRESSURE AND DEVICE FOR SAME
Filed Feb. 21, 1967　　　　　　　　　　　　5 Sheets-Sheet 3

Inventor:
WILHELM ODENDAHL
Robertson, Bryan, Parmelee & Johnson

United States Patent Office 3,469,591
Patented Sept. 30, 1969

3,469,591
METHOD OF REDUCING FLUID PRESSURE AND DEVICE FOR SAME
Wilhelm Odendahl, Hoemerichstrasse 46, Gummersbach-Steinenbruck, Germany
Filed Feb. 21, 1967, Ser. No. 617,553
Claims priority, application Germany, Feb. 25, 1966, O 11,473
Int. Cl. F15d 1/10
U.S. Cl. 137—14                          9 Claims

ABSTRACT OF THE DISCLOSURE

A method of reducing fluid pressure as embodied in five illustrative throttling valves. The reduction in pressure is done by splitting the stream into a family of inclined jets equally spaced around an axis, such as a valve plug. These jets then discharge to form a ring vortex rotating around the axis. The various embodiments shown provide valves having multiple families of jets and rotating vortices to accomplish pressure reduction in stages.

Field of the invention

This invention relates to improvements in valves, throttling cascades and like devices, controlling the flow of fluids, for example, hot water, although the invention is not limited to the above-enumerated devices and is applicable to any fluid.

Description of prior art

Throttling valves varying the free area and thereby the flow through by a movable cylindriform plug are known. Throttling plungers with longitudinal throttling grooves of triangular or trapezoidal shape are known too, as well as plungers with inclined or helical grooves. It is accepted practice to arrange such devices in series as multi-stage throttling valves and to change angular direction of helical grooves from stage to stage. It is also accepted practice to arrange downstream a vortex nozzle to intensify the throttling effect. In another known valve, the cylindriform plug opens or closes by its stroke a number of long and narrow capillary tubes to vary the flow.

These throttling valves do not satisfy full as high pressure decompression devices under modern power station conditions, partly because they quickly wear out and change their valve characteristics or fail fully, partly because the narrow throttling area becomes stopped up by the precipitation of dissolved substances when the decompression occurs within critical temperature ranges and partly because the manufacturing of such valves is so complicated that they are extremely costly and have poor reproducibility of flow characteristics.

Summary of invention

The invention is to the method of effecting a reduction in the pressure of a fluid flowing as a stream which involves guiding separate portions of the stream of fluid as a family of inclined jets equally spaced around an axis and causing a ring vortex rotating around said axis and discharging the flow through a contracted passage.

Further, the inveniton provides that the axes of said family of jets are producing elements of a single shell hyperboloid.

In addition, the inveniton is to the method of effecting a reduction in the pressure of a fluid flowing as a stream which consists in dividing the stream in two parts of coaxial but opposite direction to effect by said jets two ring vortices rotating around the axis of said hyperboloid with each ring of opposite rotation comprehending both parts of stream having ring vortices of opposite rotation at their last stages and discharging the joint flow through a lateral circular opening.

This invention overcomes the disadvantages of the known decompression valves. The new throttling devices are simple and cheap. The valve characteristics are easy to reproduce and all variations of them can be manufactured by simple tools. All flow goes through vortices having the highest velocities on the vortex cores and the lowest pressures too, thus avoiding erosion and cavitation because the vortex cores have no contact to the walls. The invention gives strong and especially rigid throttling plugs capable of withstanding the forces resulting from the energy transformation into heat.

The objects of the invention and the means for their attainment will be more apparent from the following detailed description, taken in connection with the accompanying drawings illustrating various embodiments by which the invention may be realized, and in which.

Figure 1:
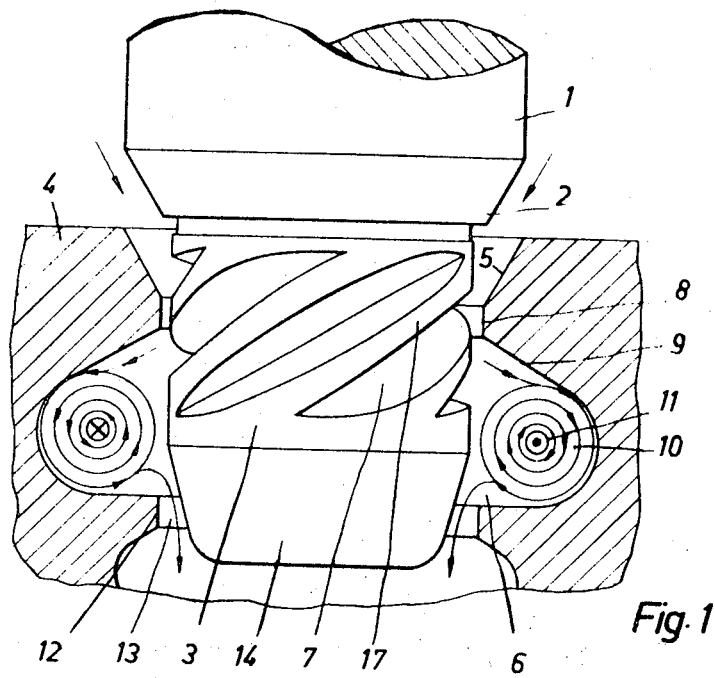
FIGURE 1 is a view, in fragmentary longitudinal section and partly in elevation, showing this invention applied to an erosion-reducing valve capable of use not only to close the flow passage but also capable of controlling the flow of fluid through it to a predetermined degree.
Figure 2:
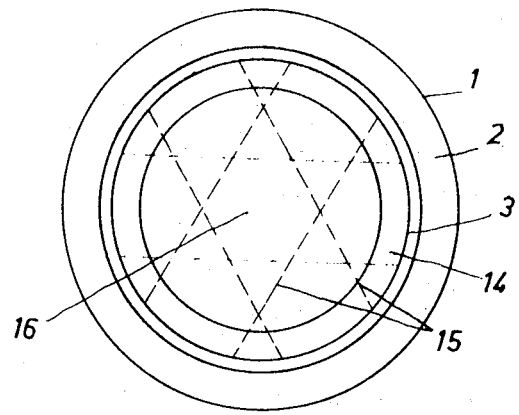
FIGURE 2 is the bottom view of the valve plug of FIGURE 1.

In FIGURE 1, the invention is shown as applied to a valve casing 4 having a frusto-conical seat surface 5 and a ring channel 6 between the annular lands 8 and 12, axially in line with which the cylindriform valve plug 3 with the seat 2 and the shaft 1 is movably arranged. The plug 3 has cut in inclined throttling grooves 7 communicating the volume upstream the land 8 to the ring channel 6. As FIGURE 2 shows, the throttling grooves 7 are cut in segmentally, the projection lines of the groove roots 15 being chords. Thus, the throttling grooves 7 can be cut easily on the milling machine by straight table travel when the plug 3 is clamped to an angle on the table. Preferably the shapes of the throttling grooves 7, according to FIGURES 4A, 4B, 4C and 4D or the like, are manufactured by form molling-cutters but, incidentally, they can be machined on the shaper too. The taper wall portion 9 on the inlet side of the ring channel 6 has the form of a single shell hyperboloid determined by the family of the groove roots 15 and therefore the flow streams into the ring channel 6 without deflection. The free area of each throttling groove 7 rises from zero to a maximum in the middle of the chord of the circular segment projected from the groove root 15 to the cross-section of the plug 3. The annular land 8 forces the flow through the inclined throttling grooves 7 and causes a rotation in the hemitoroid shaped ring channel 6 around the valve axes. In the ring channel 6 being approximately as deep as it is wide occurs a ring vortex 10 having a ring vortex core 11 in which the fluid rotates internally in the manner shown in FIGURE 1 in the form of a toroid ring and wherein the fluid friction transforms flowing energy to heat. Such ring vortices 10 are very stable and have their velocity maximum and pressure minimum near the vortex cores 11 not touching the valve walls but being closed rings. Therefore, the valve walls are not endangered by erosion or cavitation and no wear and noises occur. The annular land 12 holds the ring vortex 10 in the ring channel 6. The frusto-conical portion 14 of the plug 3 varies the area of the outlet ring annulus 13 of the ring channel 6.

As shown in FIGURE 2, the projection of the groove roots 15 to the cross-section of the valve plug 3 form a polygonal core zone 16 to withstand the tension load caused by the decompression of the fluid. The bending load of not fully symmetrical flow is not able to deform the plug 3 because the ribs 17 stiffen the plug 3.

Figure 3:
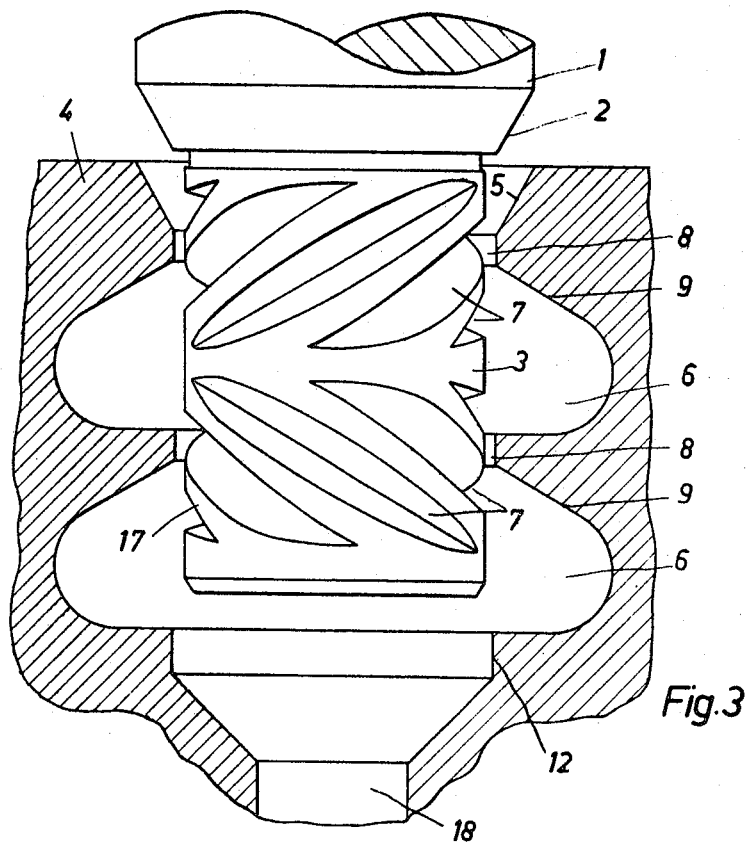
FIGURE 3 is a view, similar to FIGURE 1, but showing the valve in a multistage form.

The FIGURE 3 shows an example of a multistage valve in the form of a two-stage valve. The inclination of the throttling grooves 7 alternates from stage to stage to compensate the reaction forces by themselves. Therefore, the throttling stages are arranged in pairs. The valve outlet has the form of a vortex nozzle 18 forcing the flow to accelerate its rotation according to the law that the product of velocity and radius remains constant. Because the vector of the rotation velocity is perpendicular to the outlet direction, no pressure build-up occurs. As the maximal velocities are near the vortex core and far from the pipe wall, erosion and cavitation wear as well as cavitation noises are avoided.

Figures 4A, 4B, 4C, 4D:
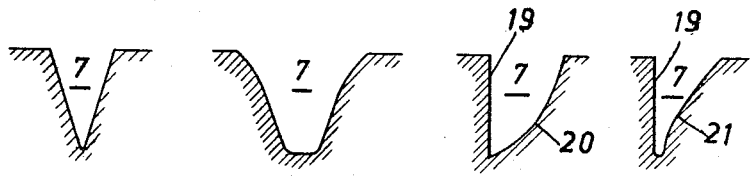
FIGURES 4A, 4B, 4C and 4D are detailed views showing, in section, different shapes of throttling channels.

The FIGURE 4A shows a triangular shaped throttling groove 7 in cross-section being advantageous to divide the flow into a plurality of part streams to deconcentrate the energy of flow. The FIGURE 4B shows in cross-section a trapezoidal shaped throttling groove 7 for maximal flow. The throttling groove 7, as shown in FIGURE 4C, has a steep even flank 19 and a concave flank 20; the throttling groove 7 as shown in FIGURE 4D has the steep even flank 19 and a convex flank 21. The curved flanks 20 and 21 make it possible to fit the valve characteristic to optimal control operation by straight milling machining of the throttling grooves 7. If the cross-sectional shape of the throttling grooves 7 for a required valve characteristic is found, it can be transposed for smaller or bigger valve sizes by the known law of similitude.

Figure 5:
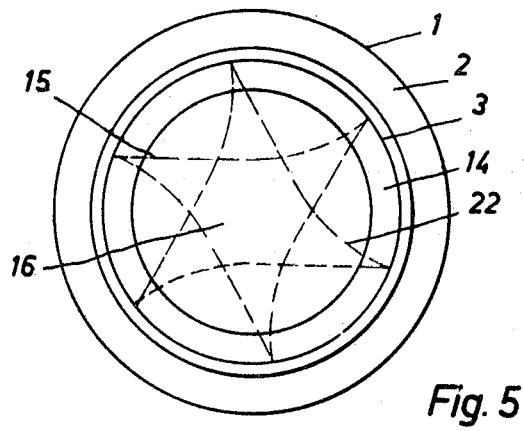
FIGURE 5 is the bottom view of the valve plug of FIGURE 1 showing a special form of the roots of the throttling channels but by form mills.

The FIGURE 5 shows in projection to the cross-section of the plug 3 the circular portion 22 of the groove root 15 machined by a milling cutter to alter the valve characteristic becoming steeper because this form in comparison to the straight grooves 7 restricts the flow in its lower range but not in its upper range.

Figure 6:
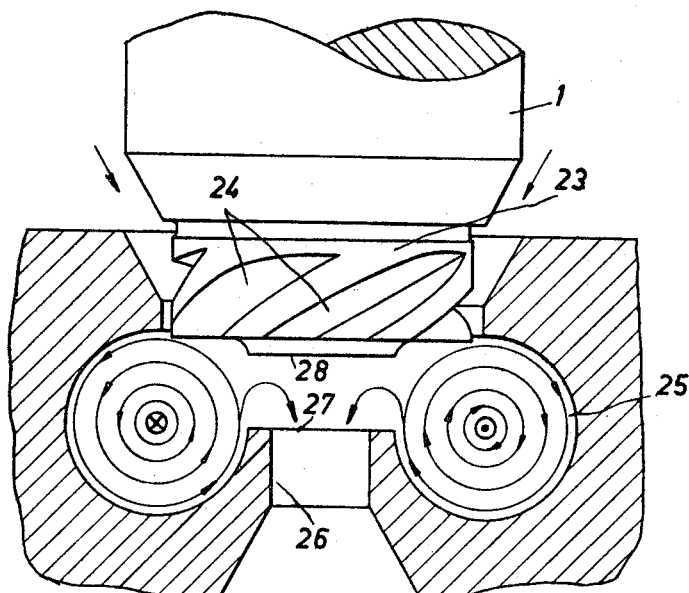
FIGURE 6 is a view, in fragmentary longitudinal section and partly in elevation, showing the valve in combination with a vortex nozzle.

The FIGURE 6 shows a single stage throttling valve with the shortened cylindriform plug 23 having cut in throttling grooves 24 being open on the outlet side. The ring channel 25 surrounds the projected vortex nozzle 26, the face of its being the casing seat 27 for the valve seat 28. Because the valve seat 28 has a small diameter, the force to open the valve is accordingly small.

Figure 7:
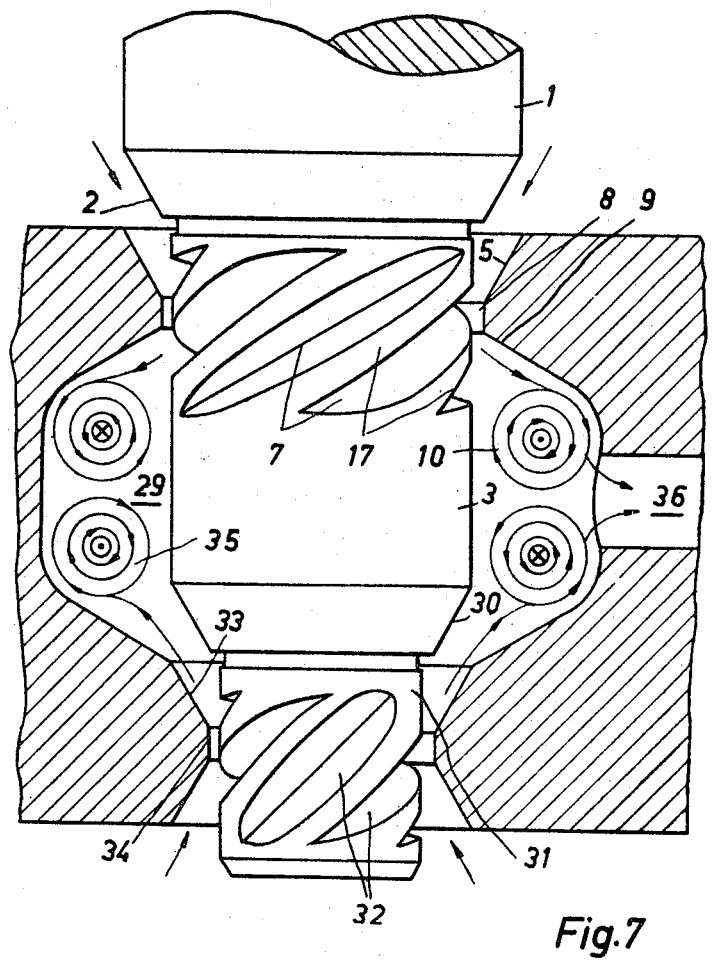
FIGURE 7 is a view, in fragmentary longitudinal section and partly in elevation, showing this invention in the form of a double seat valve with lateral vortex nozzle outlet.

The FIGURE 7 shows two single stage valves combined to one double seat valve with a joint outlet ring channel 29. The valve plug 3 has on its lower end the valve seat 30 and the cylindriform plug 31 with the segmentally cut in inclined throttling grooves 32. The casing seat 33 and the annular land 34 are machined in a manner that both combined valves tighten exactly in the same closing position. In the ring channel 29 exist two ring vortices 10 and 35 of opposite rotation direction. The flow leaves the valve by the lateral vortex throttling hole 36 with turning motion. The fluid friction is consequently very intense because of the opposite rotation of the ring vortices 10 and 35. The reaction forces can be compensated by forming the throttling grooves 7 and 32. The lateral vortex throttling hole avoids a Von Karman vortex street and its re-influence to the valve shaft 1. This double seat valve is therefore suitable for feed water control.

Figure 8:
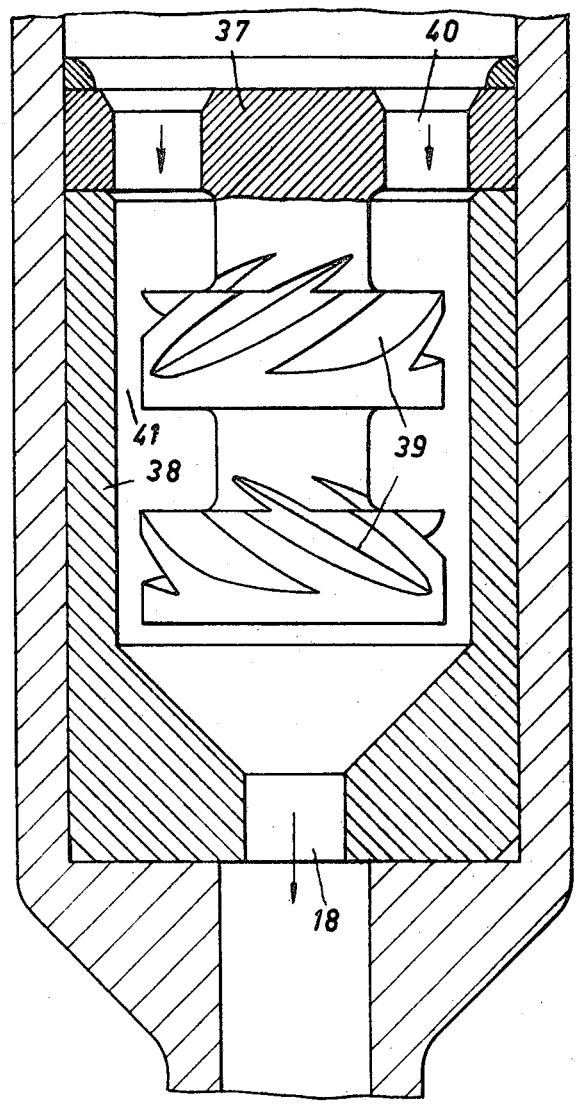
FIGURE 8 is a view similar to FIGURE 3 but showing this invention as multistage throttle with vortex nozzle outlet.

The FIGURE 8 shows the throttling device as a two-stage cascade throttle with following vortex nozzle 18. The throttling inset 37 projects into the container 38 and has cut in the throttling grooves 39. The flow passes the holes 40 and leaves the device through the vortex nozzle 18. The flow is a function of the area of the circular slit 41 and the influence of the throttling grooves 39. This throttling device, as a four-stage cascade throttle, is able to decompress hot water of a pressure 4500 p.s.i. to its wet steam pressure. The very short length of the device is advantageous.

The advantages of the present invention result from a throttling device having rotation chambers 6, the axes of which are parallel to the inlet direction, a cylindriform inset or valve plug with inclined grooves 7 communicating the rotation chambers one with another, the grooves being segmentally notched in said inset. Such segmental grooves can be exactly and economically machined by rectilinear operations. The rectilinear roots of the segmental grooves are related to space elements of a two-fold curved plane, namely, a single shell hyperboloid. Therefore, the flow passes over from the segmental grooves into the rotation chamber without interruption if the inlet surface of said chamber also has the form of the same single shell hyperboloid.

If one flank of each segmental groove is a curved surface, the valve characteristic is a simple function of that curved surface and therefore each required valve characteristic can be realized by shaping the curved flank by simplest tools. The local depths of the segmental grooves are governed by known geometrical relationships, the local free areas rise from zero to a maximum and the local rise is the product of the local groove depth differential multiplied by the outer local groove width, also the free area is to be found by integration and the groove shape as well as the form of the curved flank can be easily determined point by point. Making the other flank of each segmental groove even, especially on the shadow side, gives good control of flow. If the milling-machine table travel is stopped before the groove form milling cutter can leave the groove on the cutting side, there remains a curved portion of groove root. If this curved portion is on the inlet side, it has an influence to the valve characteristic becoming steeper within the lower range.

Because a single shell hyperboloid can be produced by two families of straight lines having opposite inclinations, there is the possibility to alternate the inclination direction of the segmental grooves in multistage throttling devices stage by stage and compensate their reaction forces.

Making the rotation chambers in form of ring channels 6 being approximately as wide as they are deep, therein the flow produces a vortex filament being a closed curve not touching the walls. The annihilation of the streaming energy by fluid friction happens near the vortex core and therefore far from the walls.

The outlet 13 acts as a central vortex nozzle, forcing all steam bubbles of flashing fluids into the vortex core and transports them through the outlet pipe without touching the pipe wall, thus avoiding cavitation wear and noises.

The throttling device, in the form of a double seat valve (FIGURE 7), gives small sizes wiht force compensated plugs. It is especially advantageous that the lateral outlet hole in form of a vortex nozzle avoids the formation of a Von Karman vortex street or flow path. As known, such a vortex street reacts on the valve shaft and causes thereon oscillations. The hydraulic forces on the double seat valve plug can be fully compensated, undercompensated or over-compensated and thus favor the closing or opening movement of the valve.

What is claimed is:
1. The method of effecting a reduction in the pressure of a fluid flowing as a stream which involves guiding separate portions of the stream of fluid as a family of inclined jets equally spaced around an axis and causing a rotating ring vortex having an internal rotation in a ring form and said ring rotating around said axis and discharging the flow through a contracted passage.

2. The method of effecting a reduction in the pressure of a fluid according to claim 1 in which said rotating ring vortex is effected by said family of inclined jets having axes that are producing elements of a single shell hyperboloid and discharging the flow through a circular nozzle.

3. The method according to claim 2 in which said discharged flow is in a concentric position to the axis of said hyperboloid.

4. The method of effecting a reduction in the pressure of a fluid according to claim 2 in which families of jets are guided into separate portions of the stream of fluid into a second family of jets, but oppositely inclined to the first jets, effecting a further ring vortex with opposite rotation around said axis of hyperboloid and discharging the total flow through a contracted passage.

5. The method of effecting a reduction in the pressure of a fluid according to claim 2 in which the fluid is passed successively through multiple flowing as a stream of families of inclined jets the axes thereof being elements of a single shell hyperboloid and effecting by said jets a ring vortex rotating around the axis of said hyperboloid, alternating the inclination of said jets from stage to stage and discharging the flow from the last stage through a circular nozzle.

6. The method of effecting a reduction in the pressure of a fluid flowing as a stream according to claim 2 which consists in dividing the stream in two parts of coaxial but opposite direction to effect by said jets two ring vortices rotating around the axis of said hyperboloid with each ring of opposite rotation, comprehending both parts of stream having ring vortices of opposite rotation at their last stages and discharging the joint flow through a lateral circular opening.

7. A throttling device for fluid flowing as a stream comprising a fixed part and an adjustable part forming between them a flow passage consisting partly of inclined grooves segmentally out in a cylindriform portion of said adjustable part and at least one ring channel around said adjustable part downstream from said inclined grooves, and a circular outlet, the roots of said inclined grooves being a family of straight lines forming a single shell hyperboloid to form the entrance surface to said ring channel.

8. A throttling device according to claim 7 in which there is on said adjustable part a second combination of said inclined grooves and said ring channel, the inclination of said last-named grooves being opposite from the first-named grooves, and a circular opening as outlet.

9. A valve according to claim 7 in which there are two inlets and two flow passages in line but in opposite direction, both passages having said plurality of inclined grooves cut into said adjustable part and a downstream ring channel, the ring channel being at the point of confluence of the two fluid passages and of a size to accommodate the two resulting rotating ring vortices, a lateral circular opening as outlet from said ring channel, and the inclinations of both families of grooves are to the same side of the valve to provide opposite rotations in said two rotating ring vortices.

References Cited

UNITED STATES PATENTS 2,541,176  2/1951  Rockwell _____ 137—625.3

FOREIGN PATENTS 981,995  2/1965  Great Britain.

DANIEL BLUM, Primary Examiner

U.S. Cl. X.R.

137—625.3; 251—126